(12) United States Patent
Zhang et al.

(10) Patent No.: US 9,106,108 B2
(45) Date of Patent: Aug. 11, 2015

(54) SMART FEED LINE AUTOMATION SYSTEM BASED ON 10KV CARRIER COMMUNICATION

(75) Inventors: Jianzhong Zhang, Linfen (CN); Limin Zhai, Linfen (CN); Qi Wei, Linfen (CN); Yunfeng Zhao, Linfen (CN); Zhiyuan Xie, Linfen (CN); Yihe Guo, Linfen (CN); Wanjun Wu, Linfen (CN); Weimin Zheng, Linfen (CN); Zhonghua Xi, Linfen (CN); Xintian Guan, Linfen (CN); Yong Zhang, Linfen (CN); Jianyun Jin, Linfen (CN); Jinping Sun, Linfen (CN)

(73) Assignee: Shanxilinfen Power Supply Company, Beijing (CN)

( * ) Notice: Subject to any disclaimer, the term of this patent is extended or adjusted under 35 U.S.C. 154(b) by 800 days.

(21) Appl. No.: 13/339,291

(22) Filed: Dec. 28, 2011

(65) Prior Publication Data
US 2012/0327989 A1    Dec. 27, 2012

(30) Foreign Application Priority Data

Jun. 27, 2011   (CN) .......................... 2011 1 0174522

(51) Int. Cl.
*H04B 3/54* (2006.01)
*H02J 13/00* (2006.01)
*H04B 3/56* (2006.01)

(52) U.S. Cl.
CPC .............. *H02J 13/0075* (2013.01); *H04B 3/54* (2013.01); *H04B 3/56* (2013.01); *H04B 2203/5483* (2013.01); *H04B 2203/5495* (2013.01); *Y02E 60/74* (2013.01); *Y02E 60/7892* (2013.01); *Y04S 10/30* (2013.01); *Y04S 40/146* (2013.01)

(58) Field of Classification Search
CPC ......................................................... H04B 3/54
USPC .......................................................... 307/1, 3
See application file for complete search history.

(56) References Cited

U.S. PATENT DOCUMENTS

| 6,040,759 | A * | 3/2000 | Sanderson .................... 725/130 |
| 2003/0218549 | A1* | 11/2003 | Logvinov et al. ......... 340/870.07 |
| 2004/0153215 | A1* | 8/2004 | Kearney et al. ............... 700/293 |
| 2006/0060007 | A1* | 3/2006 | Mekhanoshin et al. ..... 73/865.9 |
| 2008/0007416 | A1* | 1/2008 | Cern ............................. 340/664 |
| 2008/0063093 | A1* | 3/2008 | Refaeli et al. ................. 375/258 |
| 2008/0123302 | A1* | 5/2008 | Kawano et al. ............... 361/728 |

(Continued)

FOREIGN PATENT DOCUMENTS

| CN | 101373906 A | 2/2009 |
| CN | 101404419 A | 4/2009 |

(Continued)

*Primary Examiner* — Adi Amrany
(74) *Attorney, Agent, or Firm* — Schwabe Williamson & Wyatt PC (57) ABSTRACT

An embodiment of the present invention provides a smart feed line automation system based on 10 kV carrier communication. The system monitors smart switches of the line via 10 kV carrier communication, detects smart transformers, and calls up and returns centralized meter-reading information of smart transformer region. Furthermore, the detection of the state of a 10 kV power line may realize real-time monitoring of the temperature, insulating level and change of voltage and current of a 10 kV aerial line and cable line, and realize alarm for an abnormal state and fault information report, so as to rapidly identify, position, isolate and recover the fault.

5 Claims, 5 Drawing Sheets (56) References Cited

U.S. PATENT DOCUMENTS

2008/0172192 A1* 7/2008 Banhegyesi ............... 702/61
2008/0204961 A1* 8/2008 O'Leary et al. ............ 361/104
2008/0246507 A1* 10/2008 Gunn et al. ............... 324/771
2010/0007354 A1* 1/2010 Deaver et al. ............. 324/539
2010/0262395 A1* 10/2010 Sharma et al. ............. 702/79
2011/0140911 A1* 6/2011 Pant et al. ............. 340/870.02

FOREIGN PATENT DOCUMENTS

| | | |
|---|---|---|
| CN | 201298440 Y | 8/2009 |
| CN | 201298754 Y | 8/2009 |
| CN | 102227090 A | 10/2011 |

* cited by examiner

SMART FEED LINE AUTOMATION SYSTEM BASED ON 10KV CARRIER COMMUNICATION

TECHNICAL FIELD

The present invention relates to a smart feed line automation system based on 10 kV carrier communication. The system monitors smart switches of the line via 10 kV carrier communication, detects smart transformers, and calls up and returns centralized meter-reading information of smart transformer region. Furthermore, the detection of the state of a 10 kV power line may realize real-time monitoring of the temperature, insulating level and change of voltage and current of a 10 kV aerial line and cable line, and realize alarm for an abnormal state and accident information report, so as to rapidly identify, position, isolate and recover the accident.

BACKGROUND ART

Currently, following issues exist in the operation of a 10 kV aerial line and cable line: broken fault of the line resulted from the heat of the joints of the line, fault of insulation damage resulted from the overheating of the overload of the cable, pollution flashover resulted from heavy pollution of insulators, and grounding fault resulted from damage of insulation of the line equipment. Those issues lead to wide-range of power failure, greatly affecting industrial and agricultural production and daily lives of the residents. Hence, there is a need to establish a smart feed line automation system of real-time monitoring, instant identifying and fast handling.

The research and application of a 10 kV carrier communication system will become an important channel for medium and low-voltage power distribution system and power monitoring, tackling the bottleneck of the communication system in the smart application of the power distribution network, and promoting the rapid development of the smart power distribution network. Many domestic and foreign scientific research institutes and communication and electrical equipment corporations are making great efforts in the research, development and application of 10 kV carrier communication system and integrated smart equipment. However, relatively mature application technology and equipment are not proposed yet.

It should be noted that the above introduction to the background art is merely for the clarity and completeness of the explanation of the present invention, and is made for the understanding by those skilled in the art. The above technical solution should not be construed as being known to those skilled in the art as it is explained in the background art of the present invention.

SUMMARY OF THE INVENTION

The object of the present invention is to propose a smart feed line automation system based on 10 kV carrier communication, so as to solve the above technical problems. The system makes in improvement to the technologies of the modulation, demodulation, filtering, noise reduction and intense electromagnetic interference resistance of the 10 kV carrier communication, making the technologies of the 10 kV power carrier communication to reach the domestic leading level. The use of the particular tree-branch-shaped communication network of the power carrier communication does not need erection of communication line, and does not need configuration of such equipment of optical fiber communication as optical terminals, ONU, etc., greatly reducing the cost of construction.

The use of 10 kV carrier communication integrated with smart switches and organized network of 10 kV carrier communication integrated with smart transformers makes the structure of the power distribution network simple and practical, builds up smart equipment file database and dynamic database and is configured with an equipment identification authentication code, making the system capable of performing automatic identification, automatic display, automatic account establishment and automatic recording on the smart equipment. The smart feed line automation system based on 10 kV carrier communication emphasizes on the research of diagnosis of smart states, performing automatic diagnosis and analysis on the aberration parameters and aberration waveforms and controlling the operational state of the power distribution network in a real-time manner. The core is programming of fault handling: the system may alter the executable fault handling programming of the smart switches according to the operational state and adjust the protective ratings and time of action, so that the smart switches can rapidly identify, position, isolate and recover the fault.

The object of the present invention is realized by the following technical solution:

a smart feed line automation system based on 10 kV carrier communication, characterized in that a needed number of 10 kV integrated carrier communication smart switches 3, disclosed in Chinese Patent No. 200810224167.0, and 10 kV integrated carrier communication smart transformers 2, disclosed in Chinese Patent No. 200820122977.0, are connected to a main line and branch line of a 10 kV power line, so as to form the smart feed line automation system based on 10 kV carrier communication containing three networks of a power distribution network, a carrier communication network and a smart monitoring network.

The power distribution network comprises the 10 kV power line 1, the 10 kV integrated carrier communication smart transformers 2 and the 10 kV integrated carrier communication smart switches 3. The 10 kV integrated carrier communication smart transformers 2 and the 10 kV integrated carrier communication smart switches 3 are connected via the main line and branch line of the 10 kV power line.

The carrier communication network comprises line monitoring hosts 14 provided with carrier communication units, high-frequency cables 12, 10 kV couplers 11, the 10 kV power line 1, 10 kV coupling power supply modules 32 and communication modules 33 of the 10 kV integrated carrier communication smart switches 3, and 10 kV couplers 22 and communication modules 23 of the 10 kV integrated carrier communication smart transformers 2. The line monitoring host is provided at the main station point of the main line of the 10 kV power line, and the carrier communication unit of the line monitoring host is in signal connection with the 10 kV power line 1 via the high-frequency cable 12 and the 10 kV coupler 11. The 10 kV coupling power supply module 32 and communication module 33 of the 10 kV integrated carrier communication smart switches 3 provided at the main line and branch line of the 10 kV power line, as well as the 10 kV coupler 22 and communication module 23 of the 10 kV integrated carrier communication smart transformers 2, are in signal connection with the main line and branch line of the 10 kV power line.

The smart monitoring network comprises carrier communication monitoring stations 4, smart monitoring devices 34 of the 10 kV integrated carrier communication smart switches 3, and smart monitoring devices 24 of the 10 kV integrated carrier communication smart transformers 2.

The carrier communication monitoring station 4 comprises monitoring working stations 16, system monitoring servers 15 and line monitoring hosts 14, which are electrically connected to each other.

The monitoring working station comprises a monitoring operating system and a display.

The system monitoring server comprises an SCADA/GIS monitoring system, a real-time dynamic database and an equipment file database, which are electrically connected to each other. The system monitoring server is connected to the line monitoring host, and is connected to the monitoring working station via a bus line.

The line monitoring host comprises a carrier communication unit and a monitoring management unit.

The carrier communication unit of the line monitoring host comprises an adaptive coupler, a receiving/transmitting switching circuit, a specific modem, an ARM7 microprocessor system, an FPGA programmable array, a carrier communication signal input/output interface and other communication signal input/output interfaces.

The carrier communication signal input/output interface is connected to the adaptive coupler, the adaptive coupler is connected to the receiving/transmitting switching circuit and the ARM7 microprocessor system, the receiving/transmitting switching circuit is connected to the specific modem and the FPGA programmable array, the FPGA programmable array is connected to the ARM7 microprocessor system, the receiving/transmitting switching circuit and the specific modem, the specific modem is connected to the ARM7 microprocessor system via the bus line, and other communication signal input/output interfaces, namely, an optical fiber communication interface and an RS232 communication interface, are connected to the ARM7 microprocessor system via the bus line.

A carrier communication input signal is transmitted to the ARM7 microprocessor system via an input/output interface of the carrier communication unit after being identified by the adaptive coupler, the ARM7 microprocessor system determines a demodulation mode and sends an instruction, and the signal is received by the receiving/transmitting switching circuit and the specific modem in an optimal manner, a carrier communication output signal is transmitted to the ARM7 microprocessor system via the bus line by a monitoring management unit signal through a main board communication interface, the ARM7 microprocessor system determines a demodulation mode and sends an instruction, and the signal is transmitted by the receiving/transmitting switching circuit and the specific modem in an optimal manner.

The monitoring management unit of the line monitoring host comprises an ARM11 microprocessor system, abnormal information analyzing programming unit, an executable programming memory, a main board communication interface, and a monitoring working station interface; and the executable programming memory comprises a smart equipment identification programming unit and an operational mode management programming unit.

The ARM11 microprocessor system is connected to the abnormal information analyzing programming unit, the executable programming memory, the main board communication interface and the monitoring working station interface; the monitoring management unit is connected to the system monitoring server, and is connected to the monitoring working station via the bus line; and the monitoring management unit is connected to the carrier communication unit via the main board communication interface.

The smart monitoring device 34 of the 10 kV integrated carrier communication smart switches 3 comprises a carrier communication module, the ARM11 microprocessor system, the equipment identification authentication code unit, a control executing unit, the executable fault handling programming unit, and a PLC communication interface; the ARM11 microprocessor system is connected to the equipment identification authentication code unit, the control executing unit and the PLC communication interface; and the control executing unit is connected to the executable fault handling programming unit.

The smart monitoring device 24 of the 10 kV integrated carrier communication smart transformers 2 comprises a carrier communication module, the ARM11 microprocessor system, the equipment identification authentication code unit, a control executing unit, the executable fault handling programming unit, and a PLC communication interface; the ARM11 microprocessor system is connected to the equipment identification authentication code unit, the control executing unit and the PLC communication interface; and the control executing unit is connected to the executable fault handling programming unit.

Transmission of monitoring information of the smart feed line automation system based on 10 kV carrier communication comprises: the carrier communication monitoring station transmits the monitoring information to the power line via the line monitoring host and the 10 kV coupler, and to the 10 kV integrated carrier communication smart switches and the 10 kV integrated carrier communication smart transformers via the power line; and the 10 kV integrated carrier communication smart switches and the 10 kV integrated carrier communication smart transformers in turn transmit the state and detection information to the carrier communication monitoring station through the carrier communication module within the integrated smart equipment and the 10 kV coupler, and via the 10 kV power line, the 10 kV coupler of the 10 kV power line and the line monitoring host.

Automatic identification of the smart feed line automation system based on 10 kV carrier communication comprises: the equipment file database and real-time dynamic database of the monitoring station of the 10 kV smart feed line automation system, together with the equipment identification authentication code unit of the smart monitoring devices of the 10 kV integrated carrier communication smart switches and the 10 kV integrated carrier communication smart transformers, perform the smart equipment identification programming via the 10 kV power carrier communication network, so as to form the automatic identification system of the 10 kV smart feed line equipment.

Identification programming of the smart equipment comprises: perform executable programs worked out according to different features of the smart equipment, the equipment identification authentication code being an automatically executable program featuring the name, type, parameter, position and operational state of the equipment.

State diagnosis and fault handling of the smart feed line automation system based on 10 kV carrier communication comprises: the abnormal information analyzing programming unit and operational mode management programming unit of the monitoring station of the 10 kV smart feed line automation system, together with the executable fault handling programming unit of the smart monitoring devices of the 10 kV integrated carrier communication smart switches and the 10 kV integrated carrier communication smart transformers, form a fault identification, positioning, isolation and recovering system of the 10 kV smart feed line via the 10 kV power carrier communication network.

The executable fault handling programming comprises: perform operational mode program or accident handling program correspondingly according to different parameters and waveforms by using the aberration parameter standard and aberration waveform standard of the state of the line customized for the system.

The smart feed line automation system based on 10 kV carrier communication establishes particular tree-branch-shaped communication network of the carrier communication by using domestically leading 10 kV power carrier communication technologies. The use of organized network by 10 kV integrated carrier communication smart switches and 10 kV integrated carrier communication smart transformers forms a simple and practical power distribution network, builds up smart equipment file database and dynamic database and is configured with equipment identification authentication codes, making the system capable of performing automatic identification, automatic display, automatic account establishment and automatic recording on the smart equipment. An executable fault handling programming system is established, smart diagnosis and analysis on the aberration parameters and aberration waveforms of the state of the line is realized, and the operational state of the distribution network is controlled in a real-time manner. The executable fault handling programming of the smart switches may be altered according to the operational state and the protective ratings and time of action may be adjusted, so that the smart switches can rapidly identify, position, isolate and recover the fault.

The smart feed line automation system based on 10 kV carrier communication is simple in structure and convenient in installation and operation. The investment in the system is only ⅕ of that of an optical fiber communication automation system. The time period for installation is short and the cost for operation and maintenance is low, greatly reducing the cost for construction, operation and maintenance, and suitable for promotion and application in a large scale.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. To facilitate illustrating and describing some parts of the invention, corresponding portions of the drawings may be exaggerated or decreased in size.

Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiment.

These drawings are merely schematic diagrams of the structures of the present invention, and the actual structures may be different in complexity and simplicity. Within the scope of the concept of the present invention, various solutions with differences in complexity and simplicity are covered by the protection scope of the present invention, without being affected by these drawings.

DETAILED DESCRIPTION OF THE INVENTION

The foregoing and other features of the present invention will become apparent through the description below with reference to the drawings. In the description and drawings, particular embodiments of the present invention are disclosed, which show part of the embodiments that may use the principle of the present invention. It should be understood that the present invention is not limited the described embodiments, on the contrary, the present invention includes all the modifications, variants and equivalents within the scope of the appended claims.

Figure 5:
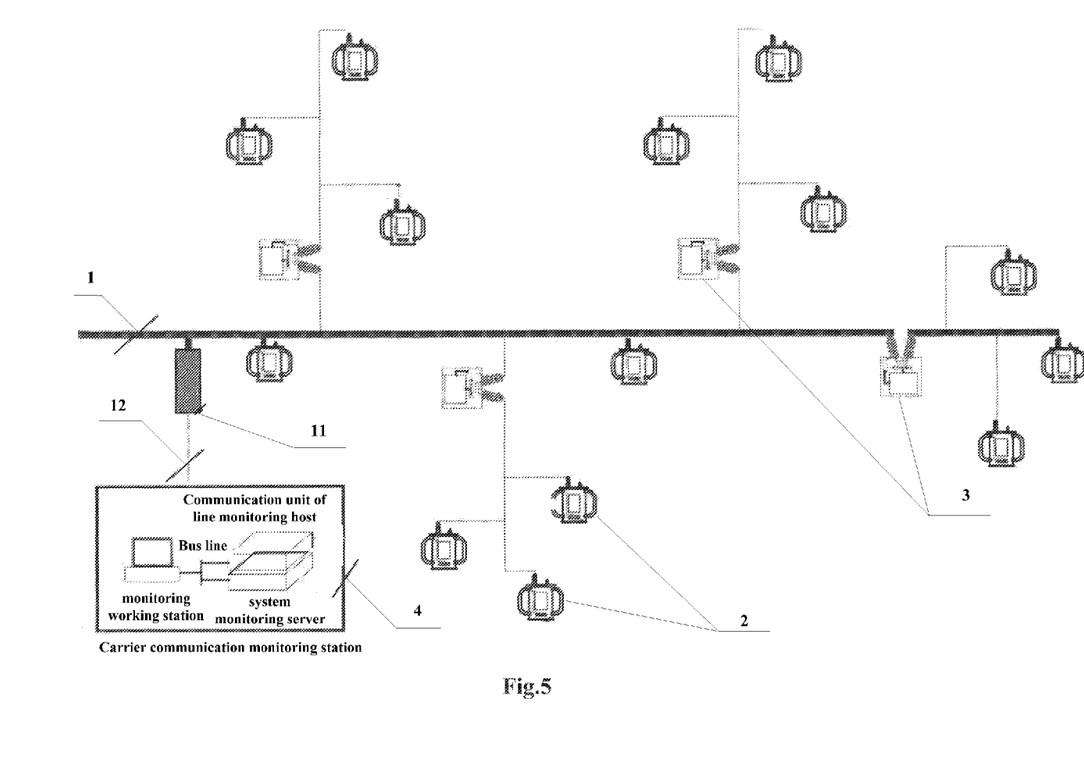
FIG. 5 is a schematic diagram of the structure of smart feed line automation system based on 10 kV carrier communication of the present invention.

Further explanations are made below with reference to the embodiments. Referring to FIG. 5, a smart feed line automation system based on 10 kV carrier communication comprises: a needed number of 10 kV integrated carrier communication smart switches 3, disclosed in Chinese Patent No. 200810224167.0, and 10 kV integrated carrier communication smart transformers 2, disclosed in Chinese Patent No. 200820122977.0, connected to a main line and branch line of a 10 kV power line, so as to form the smart feed line automation system based on 10 kV carrier communication containing three networks of a power distribution network, a carrier communication network and a smart monitoring network.

As shown in FIG. 5, the power distribution network comprises a 10 kV power line 1, the 10 kV integrated carrier communication smart transformers 2 and the 10 kV integrated carrier communication smart switches 3, wherein the 10 kV integrated carrier communication smart transformers 2 and the 10 kV integrated carrier communication smart switches 3 are connected via the main line and branch line of the 10 kV power line.

Figure 4:
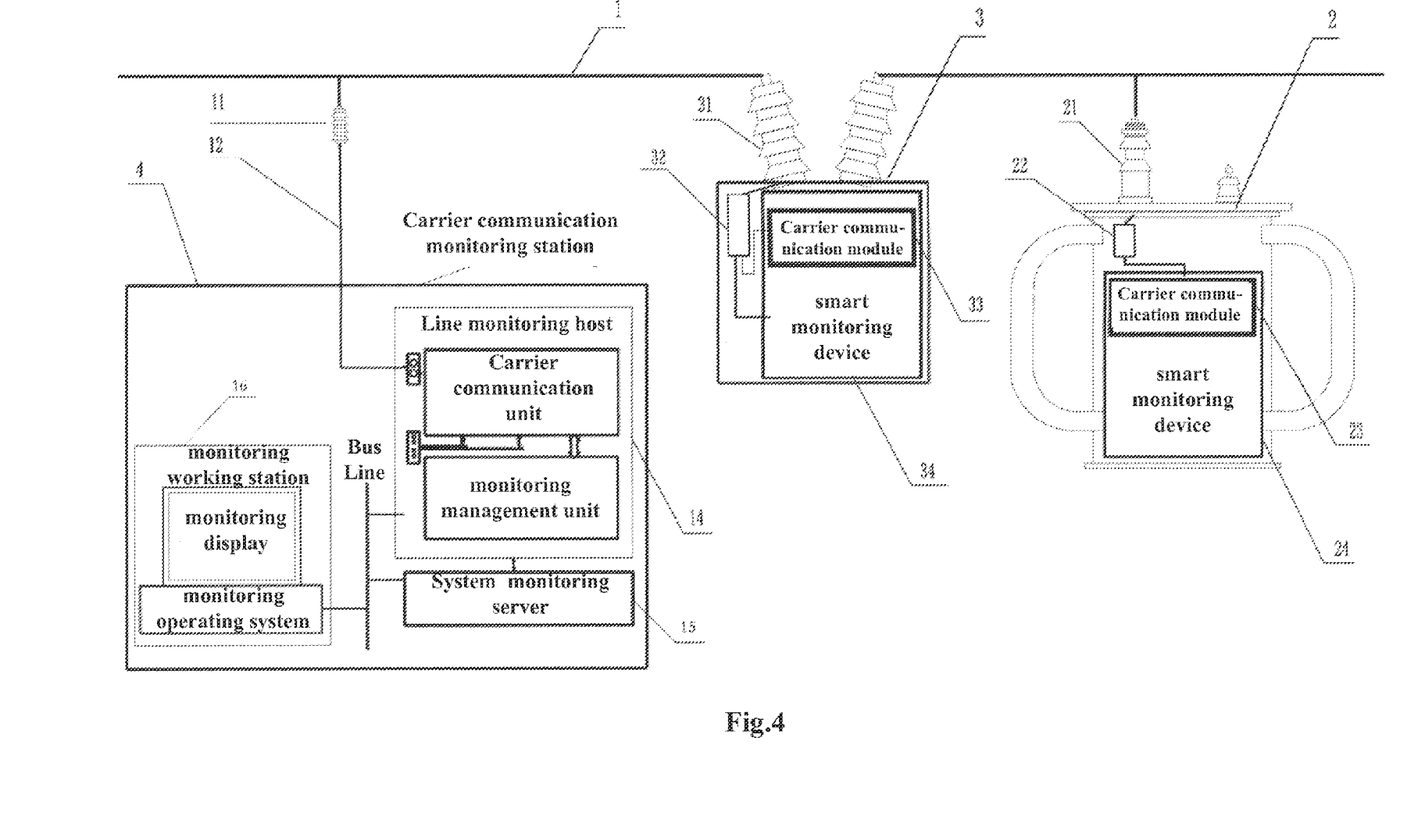
FIG. 4 is a schematic diagram of the structure of connection of the carrier communication network and the smart monitoring network of the present invention.

As shown in FIG. 4, the carrier communication network comprises line monitoring hosts 14 provided with carrier communication units, high-frequency cables 12, 10 kV couplers 11, the 10 kV power line 1, 10 kV coupling power supply modules 32 and communication modules 33 of the 10 kV integrated carrier communication smart switches 3, and 10 kV couplers 22 and communication modules 23 of the 10 kV integrated carrier communication smart transformers 2.

Wherein the line monitoring host is provided at the main station point of the main line of the 10 kV power line, and the carrier communication unit of the line monitoring host is in signal connection with the 10 kV power line 1 via the high-frequency cable 12 and the 10 kV coupler 11. The 10 kV coupling power supply module 32 and communication module 33 of the 10 kV integrated carrier communication smart switches 3 provided at the main line and branch line of the 10 kV power line, as well as the 10 kV coupler 22 and communication module 23 of the 10 kV integrated carrier communication smart transformers 2, are in signal connection with the main line and branch line of the 10 kV power line.

Figure 1:
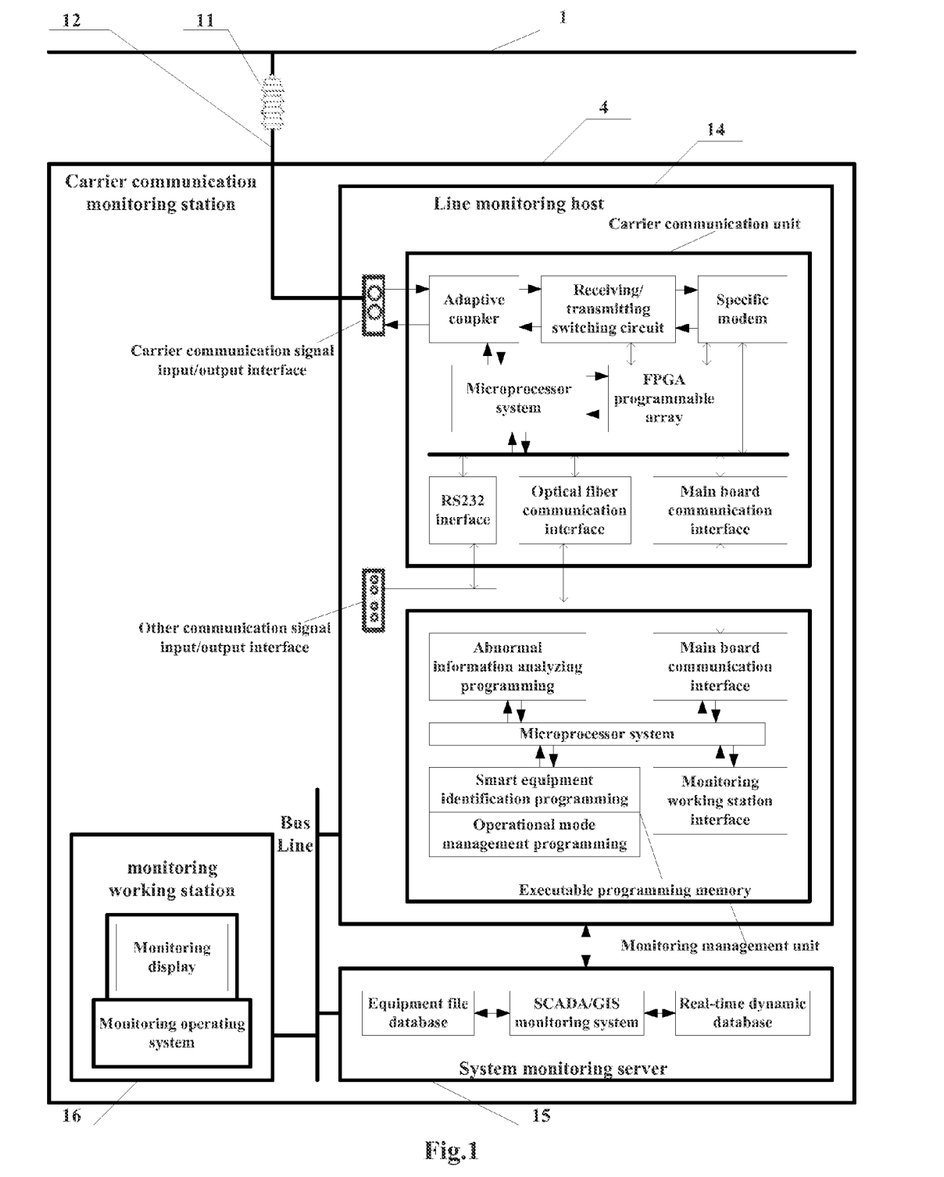
FIG. 1 is a schematic diagram of the structure of the carrier communication monitoring station of the present invention.

As shown in FIGS. 1 and 4, the smart monitoring network comprises carrier communication monitoring stations 4, smart monitoring devices 34 of the 10 kV integrated carrier communication smart switches 3, and smart monitoring devices 24 of the 10 kV integrated carrier communication smart transformers 2.

The carrier communication monitoring station 4 comprises monitoring working stations 16, system monitoring servers 15 and line monitoring hosts 14, which are electrically connected to each other.

The monitoring working station comprises a monitoring operating system and a display.

The system monitoring server comprises an SCADA/GIS monitoring system, a real-time dynamic database and an equipment file database, which are electrically connected to each other. The system monitoring server is connected to the line monitoring host, and is connected to the monitoring working station via a bus line.

The line monitoring host comprises a carrier communication unit and a monitoring management unit.

As shown in FIG. 1, the carrier communication unit of the line monitoring host comprises an adaptive coupler, a receiving/transmitting switching circuit, a specific modem, an ARM7 microprocessor system, an FPGA programmable array, a carrier communication signal input/output interface and other communication signal input/output interfaces.

The carrier communication signal input/output interface is connected to the adaptive coupler, the adaptive coupler is connected to the receiving/transmitting switching circuit and the ARM7 microprocessor system, the receiving/transmitting switching circuit is connected to the specific modem and the FPGA programmable array, the FPGA programmable array is connected to the ARM7 microprocessor system, the receiving/transmitting switching circuit and the specific modem, the specific modem is connected to the ARM7 microprocessor system via the bus line, and other communication signal input/output interfaces, namely, an optical fiber communication interface and an RS232 communication interface, are connected to the ARM7 microprocessor system via the bus line.

A carrier communication input signal is transmitted to the ARM7 microprocessor system via an input/output interface of the carrier communication unit after being identified by the adaptive coupler, the ARM7 microprocessor system determines a demodulation mode and sends an instruction, and the signal is received by the receiving/transmitting switching circuit and the specific modem in an optimal manner, a carrier communication output signal is transmitted to the ARM7 microprocessor system via the bus line by a monitoring management unit signal through a main board communication interface, the ARM7 microprocessor system determines a demodulation mode and sends an instruction, and the signal is transmitted by the receiving/transmitting switching circuit and the specific modem in an optimal manner.

As shown in FIG. 1, the monitoring management unit of the line monitoring host comprises an ARM11 microprocessor system, abnormal information analyzing programming unit, an executable programming memory, a main board communication interface, and a monitoring working station interface; and the executable programming memory comprises a smart equipment identification programming unit and an operational mode management programming unit.

The ARM11 microprocessor system is connected to the abnormal information analyzing programming unit, the executable programming memory, the main board communication interface and the monitoring working station interface; the monitoring management unit is connected to the system monitoring server, and is connected to the monitoring working station via the bus line; and the monitoring management unit is connected to the carrier communication unit via the main board communication interface.

Figure 3:
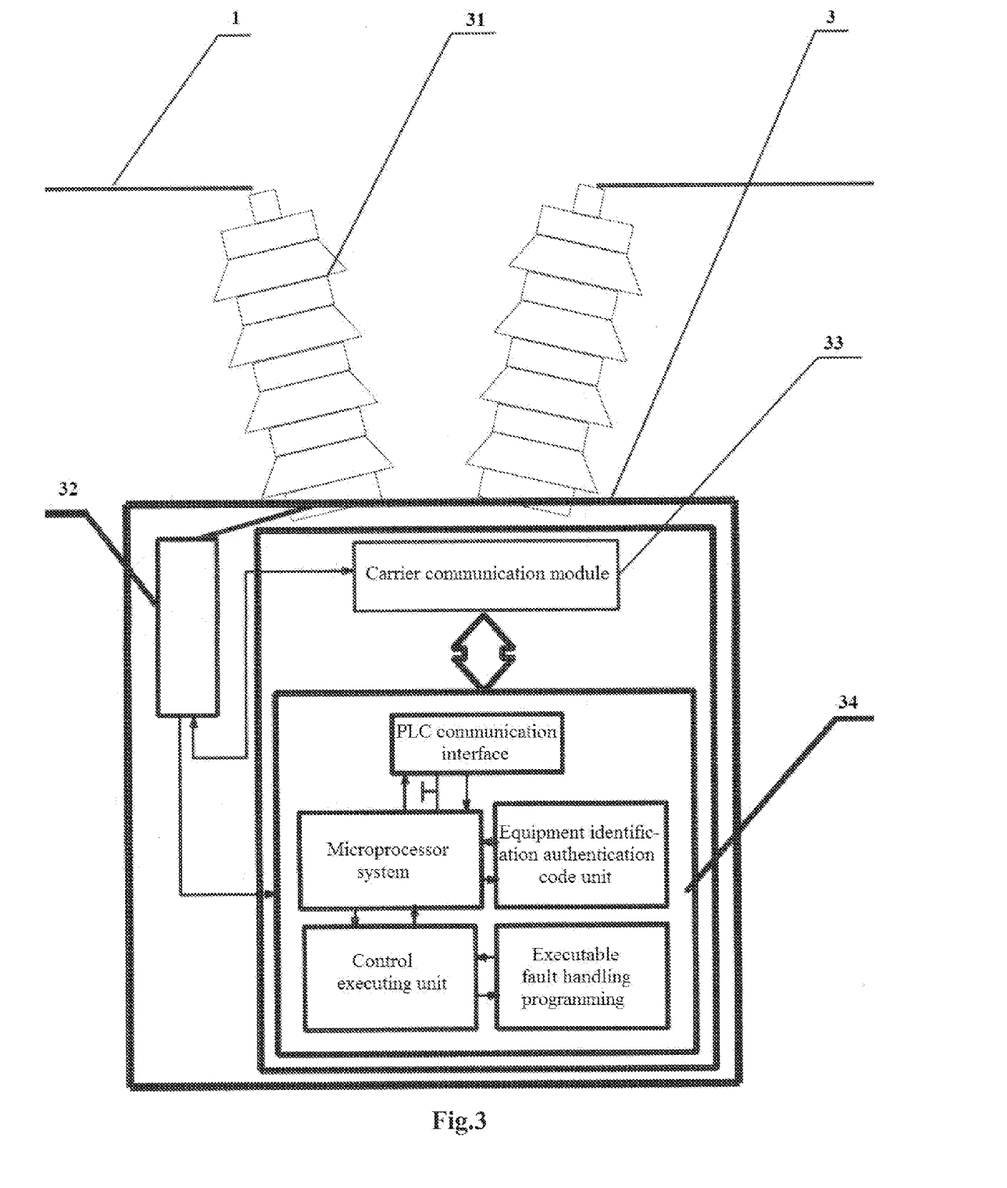
FIG. 3 is a schematic diagram of the structure of the integrated carrier communication smart switch of the present invention.

As shown in FIG. 3, the smart monitoring device 34 of the 10 kV integrated carrier communication smart switches 3 comprises a carrier communication module, the ARM11 microprocessor system, the equipment identification authentication code unit, a control executing unit, the executable fault handling programming unit, and a PLC communication interface; the ARM11 microprocessor system is connected to the equipment identification authentication code unit, the control executing unit and the PLC communication interface; and the control executing unit is connected to the executable fault handling programming unit.

Figure 2:
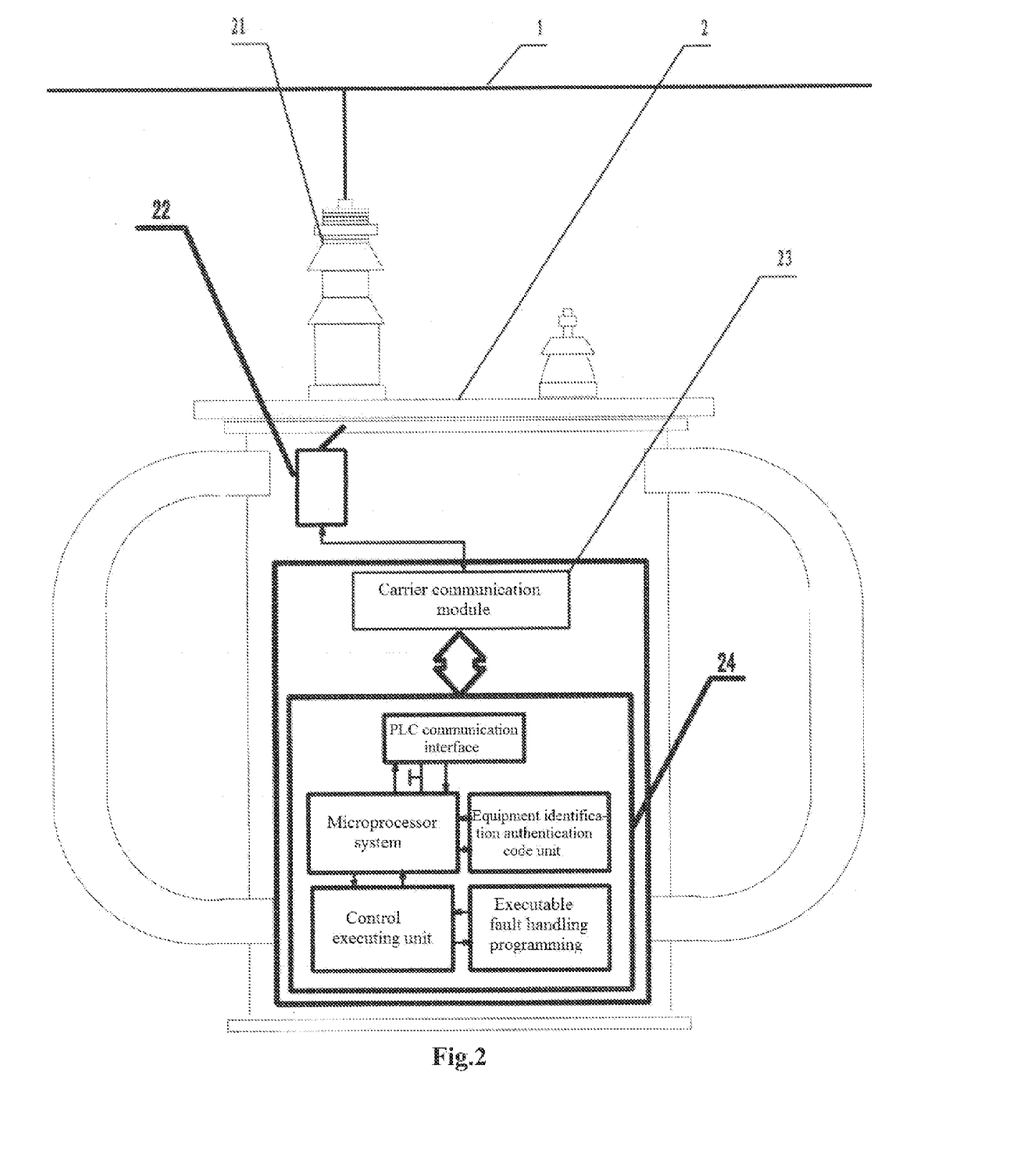
FIG. 2 is a schematic diagram of the structure of the integrated carrier communication smart transform of the present invention.

The smart monitoring device 24 of the 10 kV integrated carrier communication smart transformers 2 comprises a carrier communication module, the ARM11 microprocessor system, the equipment identification authentication code unit, a control executing unit, the executable fault handling programming unit, and a PLC communication interface; the ARM11 microprocessor system is connected to the equipment identification authentication code unit, the control executing unit and the PLC communication interface; and the control executing unit is connected to the executable fault handling programming unit.

As shown in FIGS. 1, 2 and 3, the transmission of monitoring information of the smart feed line automation system based on 10 kV carrier communication may be performed in a manner as follows: the carrier communication monitoring station transmits the monitoring information to the power line via the line monitoring host and the 10 kV coupler, and to the 10 kV integrated carrier communication smart switches and the 10 kV integrated carrier communication smart transformers via the power line; and the 10 kV integrated carrier communication smart switches and the 10 kV integrated carrier communication smart transformers in turn transmit the state and detection information to the carrier communication monitoring station through the carrier communication module within the integrated smart equipment and the 10 kV coupler, and via the 10 kV power line, the 10 kV coupler of the 10 kV power line and the line monitoring host.

As shown in FIGS. 1, 2 and 3, the automatic identification of the smart feed line automation system based on 10 kV carrier communication may be performed in a manner as follows: the equipment file database and real-time dynamic database of the monitoring station of the 10 kV smart feed line automation system, together with the equipment identification authentication code unit of the smart monitoring devices of the 10 kV integrated carrier communication smart switches and the 10 kV integrated carrier communication smart transformers, perform the smart equipment identification programming via the 10 kV power carrier communication network, so as to form the automatic identification system of the 10 kV smart feed line equipment.

Wherein, the identification program of the smart equipment is executable programs worked out according to different features of the smart equipment, the equipment identification authentication code being an automatically executable program featuring the name, type, parameters, position and operational state of the equipment.

As shown in FIGS. 1, 2 and 3, the state diagnosis and fault handling of the smart feed line automation system based on 10 kV carrier communication: the abnormal information analyzing programming unit and operational mode management programming unit of the monitoring station of the 10 kV smart feed line automation system, together with the executable fault handling programming unit of the smart monitoring devices of the 10 kV integrated carrier communication smart switches and the 10 kV integrated carrier communication smart transformers, form a fault identification, positioning, isolation and recovering system of the 10 kV smart feed line via the 10 kV power carrier communication network.

Wherein, the executable fault handling program is operational mode program or tripping program correspondingly executed according to different parameters and 10$o$ waveforms by using the aberration parameter standard and aberration waveform standard of the state of the line customized for the system.

In this embodiment, following report on the operation of the smart feed line automation system based on 10 kV carrier communication is obtained: in the beginning of March, 2010, six 10 kV integrated carrier communication smart switches of three sets were installed in each of the two lines in a power sub-station of a certain power supply branch company, where a carrier communication monitoring sub-station was established and put into operation. The system of the carrier communication monitoring sub-station operated normally, the action of remote-control operation was correct, the remotely-detected signals were normal, and the action of protection was reliable.

The protection of the 10 kV integrated carrier communication smart switches was matched with the protection of the line of the power sub-station. The actions of the protection were as follows: at 18:49, Mar. 12, 2010, the Luchun Branch of No. 599 line tripped correctly due to overcurrent; at 12:02. Apr. 24, 2010, the Wangchun Branch of No. 599 line tripped correctly due to overcurrent; at 15:30, Feb. 18, 2011, the Fuyuhe Branch of No. 595 line tripped correctly due to fast breaking action.

After the nearly one year test on operation experiencing a hot summer, thunder and rainy environments and a cold winter, the 10 kV integrated carrier communication smart switches operated normally, the remote control and action of protection were correct and reliable, and the transmission of the data was stable. The expected requirements were achieved.

In regard to the smart feed line automation system based on 10 kV carrier communication, the power supply company of a certain province organized a meeting to evaluate the inventive achievements of the project of the smart feed line automation system based on 10 kV carrier communication. The experts for the evaluation heard the report of the project group, examined relevant technical data, and provided the following opinions after inquiries and discussion:

(1) the data for evaluation provided by the project group were complete and met the requirements for evaluation;

(2) the research and improvement of the system were made on the basis of the existing power carrier communication technologies, making the distance of transmission of the power carrier signal to reach 14 kilometers; and a smart equipment automatic identification system was employed, realizing the functions of automatic identification, automatic display, automatic account establishment and automatic recording of the smart equipment;

(3) the system realized the functions of remote detection, remote signaling and remote control, the data were accurate, and the actions were correct. The use of carrier communication integrated with smart switches and organized network of carrier communication integrated with smart transformers made the structure simple, operation and maintenance convenient, saving the investment and reducing the cost of operation.

With respect to the development of smart power distribution network, the project made efficient progress, fulfilled the expected plan, achieved the expected goal, and was approved for passing the inspection. The project reached the domestically leading level in the communication modulation, demodulation, filtering and interference resistance of power carrier communication technologies. It was suggested that the application applicability of the system be sped up and the range of application be expanded.

It should be noted that all the above-described power distribution networks are power distribution networks with voltages of up to and including 10 kV, and the carrier communication networks are 10 kV carrier communication networks.

The present invention is described above with reference to a particular embodiment. However, it should be understood by those skilled in the art that such descriptions are exemplary only and are not intended to limit the protection scope of the present invention. Various variants and modifications may be made by those skilled in the art in accordance with the spirits and principle of the present invention, which fall within the scope of the present invention.

What is claimed is:

1. A feed line automation system, comprising:
a main line;
a plurality of branch lines coupled to the main line to form a tree-branch-shaped network;
a plurality of integrated carrier communication switches and a plurality of integrated carrier communication transformers respectively coupled to the main line or at least one of the plurality of branch lines; wherein each of the integrated carrier communication switches includes a first carrier communication module and a first monitoring device, wherein each of the integrated carrier communication transformers includes a second carrier communication module and a second monitoring device; and
a carrier communication monitoring station, coupled to the main line via a coupler, to identify fault information in the tree-branch-shaped network;
wherein the carrier communication monitoring station includes a carrier communication unit to communicate with respective carrier communication modules in the plurality of integrated carrier communication switches and the plurality of integrated carrier communication transformers;
wherein the carrier communication monitoring station includes a monitoring management unit, coupled to the communication unit via a main board communication interface, to receive the fault information via the carrier communication unit from at least one monitoring device in the plurality of integrated carrier communication switches or the plurality of integrated carrier communication transformers;
wherein the carrier communication monitoring station includes a system monitoring server, a monitoring working station, and a line monitoring host;
wherein the system monitoring server comprises an SCADA/GIS monitoring system, an equipment file database, and a real-time dynamic database;
wherein the monitoring working station comprises a monitoring operating system, and a monitoring display;
wherein the line monitoring host comprises the carrier communication unit and the monitoring management unit; and
wherein the monitoring working station is connected to the system monitoring server and the line monitoring host via a bus line; and
wherein the carrier communication unit of the line monitoring host comprises an adaptive coupler, a receiving/ transmitting switching circuit, a modem, a microprocessor system, an FPGA programmable array, a carrier communication signal input/output interface, and communication signal input/output interfaces:
wherein the carrier communication signal input/output interface is connected to the adaptive coupler; the adaptive coupler is connected to the receiving/transmitting switching circuit and the microprocessor system; the receiving/transmitting switching circuit is connected to the modem and the FPGA programmable array; the FPGA programmable array is connected to the microprocessor system, the receiving/transmitting switching circuit and the modem; the modem is connected to the microprocessor system via the bus line; and the communication signal input/output interfaces are connected to the microprocessor system via the bus line;
wherein the adaptive coupler is to identify and transmit a carrier communication input signal to the microprocessor system via the carrier communication signal input/output interface; wherein the microprocessor system is to determine a demodulation mode;
wherein the monitoring management unit is to transmit a carrier communication output signal to the microprocessor system via the bus line through the main board communication interface.

2. The feed line automation system according to claim 1, wherein the microprocessor system is an ARM7 microprocessor system, and the communication signal input/output interfaces comprise an optical fiber communication interface and an RS232 communication interface.

3. The feed line automation system according to claim 1, wherein the monitoring management unit of the line monitoring host comprises an ARM11 microprocessor system, abnormal information analyzing programming memory, an executable programming memory, a main board communication interface, and a monitoring working station interface;
and wherein the executable programming memory comprises equipment identification programming memory and operational mode management programming memory;
wherein the ARM11 microprocessor system of the monitoring management unit is connected to the abnormal information analyzing programming memory, the executable programming memory, the main board communication interface and the monitoring working station interface; and
the monitoring management unit is connected to the system monitoring server, and is connected to the monitoring working station via the bus line; and the monitoring management unit is connected to the carrier communication unit via the main board communication interface.

4. The feed line automation system according to claim 1, wherein the carrier communication monitoring station is to identify individual switch of the plurality of integrated carrier communication switches and individual transformer of the plurality of integrated carrier communication transformers based at least in part on a equipment file database in the carrier communication monitoring station and respective equipment identification authentication code units in the plurality of integrated carrier communication switches and the plurality of integrated carrier communication transformers.

5. The feed line automation system according to claim 1, wherein the carrier communication monitoring station is to identify the faulty information based at least in part on an abnormal information analyzing programming unit and an operational mode management programming unit in the carrier communication monitoring station, and respective executable fault handling programming units in the plurality of integrated carrier communication switches and the plurality of integrated carrier communication transformers.

* * * * *

UNITED STATES PATENT AND TRADEMARK OFFICE
CERTIFICATE OF CORRECTION

PATENT NO. : 9,106,108 B2
APPLICATION NO. : 13/339291
DATED : August 11, 2015
INVENTOR(S) : Jianzhong Zhang Page 1 of 1

It is certified that error appears in the above-identified patent and that said Letters Patent is hereby corrected as shown below:

Title page, item (73) Assignee: Change

Shanxilinfen Power Supply Company, Beijing (CN)

to:

Shanxilinfen Power Supply Company, Beijing (CN); State Grid Corporation of China, Beijing (CN)

Signed and Sealed this
Twelfth Day of April, 2016

Michelle K. Lee
*Director of the United States Patent and Trademark Office*